United States Patent
Kuhn et al.

(10) Patent No.: US 12,480,183 B2
(45) Date of Patent: Nov. 25, 2025

(54) WROUGHT ALLOY FOR A BEARING MATERIAL

(71) Applicant: Wieland-Werke AG, Ulm (DE)

(72) Inventors: Hans-Achim Kuhn, Illertissen (DE); Susanne Müller, Bellenberg (DE); Volker Voggeser, Senden (DE)

(73) Assignee: WIELAND-WERKE AG, Ulm (DE)

( * ) Notice: Subject to any disclaimer, the term of this patent is extended or adjusted under 35 U.S.C. 154(b) by 216 days.

(21) Appl. No.: 18/306,331

(22) Filed: Apr. 25, 2023

(65) Prior Publication Data

US 2023/0357894 A1 Nov. 9, 2023

(30) Foreign Application Priority Data

May 4, 2022 (DE) ...................... 10 2022 001 563.3

(51) Int. Cl.
*C22C 9/04* (2006.01)
*F16C 33/12* (2006.01)

(52) U.S. Cl.
CPC .............. *C22C 9/04* (2013.01); *F16C 33/121* (2013.01); *F16C 2204/14* (2013.01); *F16C 2360/24* (2013.01)

(58) Field of Classification Search
CPC . C22C 9/04; C22C 1/02; F16C 33/121; F16C 2204/14; F16C 2360/24; C22F 1/08
See application file for complete search history.

(56) References Cited

U.S. PATENT DOCUMENTS

| | | | |
|---|---|---|---|
| 11,142,810 B2 | 10/2021 | Kuhn et al. | |
| 11,359,263 B2 | 6/2022 | Gummert et al. | |
| 2006/0063023 A1* | 3/2006 | Barbezat | C23C 24/04 427/427 |
| 2009/0022620 A1 | 1/2009 | Weber | |
| 2012/0251383 A1* | 10/2012 | Toda | F01D 25/16 420/482 |
| 2014/0170016 A1* | 6/2014 | Kaeufler | C22C 9/04 420/472 |
| 2015/0093239 A1* | 4/2015 | Takama | F01D 25/005 415/200 |
| 2020/0283872 A1* | 9/2020 | Kuhn | F16C 33/121 |

FOREIGN PATENT DOCUMENTS

| | | | | |
|---|---|---|---|---|
| CN | 101386931 | | 3/2009 | |
| CN | 111424189 A | * | 7/2020 | ............... C22C 9/04 |
| DE | 102007029991 A1 | | 1/2009 | |
| DE | 102010055055 B3 | | 5/2012 | |
| DE | 102016001994 A1 | | 8/2017 | |
| EP | 2743360 A1 | | 6/2014 | |
| EP | 3417083 B1 | | 12/2018 | |
| JP | S60149740 A | * | 8/1985 | |
| JP | 63277732 A | | 11/1988 | |
| JP | 1252745 A | | 10/1989 | |
| JP | H01252745 | * | 10/1989 | ............... C22C 9/04 |
| WO | 2017198698 A1 | | 11/2017 | |

OTHER PUBLICATIONS

JPH01252745, machine translation. (Year: 1989).*
CN111424189a, machine translation. (Year: 2020).*
JPS60149740a, machine translation. (Year: 1985).*
European Search Report issued in corresponding European Application No. 23000052.3 with English translation of categories of cited documents, dated Aug. 22, 2023 (6 pages).
German Office Action issued in corresponding German Application No. 10 2022 001 563.3, mailed Feb. 13, 2023 (5 pages).
German Office Action issued in corresponding German Application No. 10 2022 001 563.3, mailed Nov. 25, 2024 (3 pages).
Kurt Dies; Copper and copper alloys in industry, with partial English translation; Springer-Verlag, 1967, pp. 317, 348, 349, 368-370 (11 pages).
Keller, Hans et al., Copper and Copper Alloys, with partial English translation, 3rd ed. Berlin: Springer, 1955 (Workshop Books, for Operatives, Designers and Skilled Workers; 45) p. 34 (3 pages).
Copper-Zinc Alloys (Brass and Specialty Brass), with partial English translation; German Copper Institute, 2007 pp. 2-23 and tables (33 pages).

* cited by examiner

*Primary Examiner* — John A Hevey
(74) *Attorney, Agent, or Firm* — FLYNN THIEL, P.C.

(57) ABSTRACT

A wrought alloy for a bearing material for use as valve guide or in turbochargers of internal-combustion engines operated with ethanol-containing fuels. The composition of the wrought alloy is as follows in wt %: Zn: 25.0-34.0%; Fe: 0.8-1.2%; Sn: 0.8-1.2%; Al: 1.3-1.7%; Si: 0.2-0.45%; and Pb: up to 0.1%, with the balance being copper and unavoidable impurities. The sum total of all elements not belonging to the group of the elements copper, zinc, iron, tin, aluminum and silicon is at most 0.3 wt %. The alloy has a microstructure including precipitates in the form of silicides with a fraction of 0.5 to 2.0 vol %.

13 Claims, No Drawings

WROUGHT ALLOY FOR A BEARING MATERIAL

CROSS-REFERENCE TO RELATED APPLICATION

This claims priority from German Application No. 10 2022 001 563.3, filed May 4, 2022, the disclosure of which is hereby incorporated by reference in its entirety.

TECHNICAL FIELD

The invention relates to a wrought alloy for use as bearing material, to a semifinished product in rod, pipe or strip form that is composed of such an alloy, to a sliding element comprising a material composed of such an alloy, and to a turbocharger comprising such a sliding element.

BACKGROUND AND SUMMARY

Sliding elements composed of copper-zinc alloys are used as valve guides or in turbochargers for internal-combustion engines. Where internal-combustion engines are operated with ethanol-containing fuels, mixtures of engine oil and ethanol are formed. The sliding elements may be exposed to such mixtures. The bearing materials must therefore be resistant to corrosion in such ethanol-containing mixtures. Furthermore, statutory provisions require a reduction in the lead fraction in the material to a minimum.

One known copper-zinc alloy for sliding elements is CuZn31Si1. Up to 0.8 wt % of lead may be admixed in the alloy in order to improve the machinability of the material. The high fraction of copper in this alloy makes the sliding element expensive.

The publication DE 10 2016 001 994 A1 discloses a sliding element composed of a copper-zinc alloy with 60.0 to 64.0% Cu, 0.2 to 0.5% Si, 0.6 to 1.2% Fe, optionally also up to a maximum of 1.5% Sn, up to a maximum of 0.25% Pb, up to a maximum of 0.08% P, the balance being Zn and unavoidable impurities. This copper-zinc alloy has a microstructure consisting of α- and β-phase with a volume fraction of the α-phase of at least 90%, with iron silicides being included in the microstructure.

The object on which the invention is based is that of providing a wrought alloy for a bearing material having improved corrosion resistance to ethanol-oil mixtures. In terms of the mechanical properties, the alloy ought to have a hardness of at least 190 HV10, a tensile strength $R_m$ of at least 600 MPa, a yield point $R_{p0.2}$ of at least 500 MPa, and an elongation at break As of at least 118. For favorable wear characteristics, it ought to be possible to achieve friction coefficients below 0.06 with the alloy. The flexural fatigue strength ought to be at the level of known bearing materials.

DETAILED DESCRIPTION

The invention relates to a wrought alloy for a bearing material for use as valve guide or in turbochargers of internal-combustion engines operated with ethanol-containing fuels, the composition of the wrought alloy being as follows in wt %:
Zn: 25.0-34.0%
Fe: 0.8-1.2%
Sn: 0.8-1.2%
Al: 1.3-1.7%
Si: 0.2-0.45%
Pb: up to 0.1%,
balance copper and unavoidable impurities, with the sum total of all elements not belonging to the group of the elements copper, zinc, iron, tin, aluminum and silicon being at most 0.3 wt %, and with the alloy having a microstructure including precipitates in the form of silicides with a fraction of 0.5 to 2.0 vol %.

Materials composed of this alloy are notable for a hardness of at least 190 HV10, a tensile strength $R_m$ of at least 600 MPa, a yield point $R_{p0.2}$ of at least 500 MPa and an elongation at break $A_5$ of at least 118. Because of the high hardness, the materials are very wear-resistant under frictional load. In wear tests and also under constant sustained load, and even when the load is raised in stages, the materials generate friction coefficients which are at the level of existing materials used, such as, for example, the lead-containing alloy CuZn31Si1 or the alloy CuNi6Sn6, which is very expensive owing to the nickel and tin fractions. Under dynamic fluctuating load as well, in other words under oscillating application of compressive stress and tensile stress, the alloy displays results similar to those obtained on CuZn31Si1. If the zinc fraction of the alloy is between 32 and 34 wt %, then results achieved are in fact better than with CuZn31Si1. The proposed alloy therefore represents a lead-free and inexpensive alternative to known materials.

The fraction of 1.3-1.7 wt % aluminum makes the alloy resistant to corrosion in ethanol-containing media, such as ethanol-oil mixtures, for example. Furthermore, the addition of aluminum improves the ratio of strength to ductility. At a yield point $R_{p0.2}$ of at least 500 MPa, an elongation at break $A_5$ of at least 15% is achievable. It is possible alternatively to formulate alloy compositions in which the tensile strength $R_m$ is at least 650 MPa and at the same time the elongation at break is at least 11%. Generally speaking, the relationship between tensile strength $R_m$ in MPa and the minimum achievable elongation at break $A_5$ in percent may be quantified by the following formula:

$$A_5 \geq -0.2292 \cdot R_m + 161$$

Through the selection of the elements copper and zinc it is possible to adjust the fraction of the β-phase in the microstructure. At a zinc fraction of between 25 and 28 wt %, there is no β-phase present. The microstructure consists only of α-phase with silicides included therein. At zinc fractions of greater than 28 wt %, the microstructure has fractions of β-phase, these fractions having a proportion by area, for a zinc fraction of 30 wt %, of approximately 158; for a zinc fraction of 31 wt %, approximately 258; and, for a zinc fraction of 33 wt %, approximately 50%. Although the β-phase is more susceptible to corrosion than the x-phase, the alloy, even at a β-phase fraction of 50%, is still resistant toward corrosion in ethanol-oil mixtures. The cause of this is the protective effect of the aluminum. The protective effect of the aluminum therefore makes it possible to adapt the fraction of the β-phase to the service conditions within a wide range without affecting the corrosion resistance. Alloy compositions which have no β-phase are very ductile and are readily amenable to cold forming. Such alloys feature an elongation at break $A_5$ of at least 20%. With increasing fraction of β-phase, i.e. with increasing Zn fraction, there is a slight reduction in the ductility. At a fraction of β-phase of 30%, an elongation at break $A_5$ of 15% is still achieved. Conversely, as the Zn fraction increases, there are improvements in the strength and in the machineability. At a zinc fraction of between 29 and 34 wt % it is possible to achieve a tensile strength of at least 630 MPa with an elongation at break $A_5$ of at least 11%.

Iron and silicon form iron silicides, which are included as precipitates in the microstructure. As hard phases, iron silicides are the cause of the good wear resistance of the material. At a silicon fraction below 0.2 wt %, the formation of iron silicides would be insufficient. The silicon fraction is preferably at least 0.27 wt %. A silicon fraction of above 0.45 wt % would lead to greater formation of the β-phase and hence would reduce the ductility. In particular, the alloy has a microstructure in which there are iron silicide precipitates with a circular or elliptical shape with an equivalent diameter of at least 2 μm. The density of these precipitates is at least 1000 per mm² and at most 2500 per mm². The microstructure also contains iron silicide precipitates having a circular or elliptical shape with an equivalent diameter of at least 5 μm, and the density of these precipitates is at least 40 per mm² and at most 300 per mm². If there is β-phase in the alloy, then the iron silicide precipitates either are embedded in the x-phase or are located at the phase boundary between the x-phase and the β-phase. The β-phase is largely free from iron silicide precipitates.

The fraction of lead is not more than 0.1 wt %, in order to meet the statutory mandates. Even with lead fractions of not more than 0.07 wt %, preferably not more than 0.04 wts, the alloy still has very good frictional characteristics and also very good machining properties.

The sum total of all the unavoidable impurities ought not to be more, together with the fraction of lead, than 0.3 wt %, so that these elements do not adversely affect the alloy. In particular, the Mn fraction ought to be at most 0.1 wt %, the Ni fraction at most 0.1 wt %, preferably not more than 0.05 wt %, more preferably not more than 100 ppm by weight, and the fraction of Bi ought to be not more than 0.05 wt % and the fraction of P not more than 0.01 wt %. Manganese and nickel compete with iron in the formation of silicides. The effect of restricting Mn and Ni is that predominantly the iron silicides are formed which are favorable for the wear characteristics. Bi is an element which leads to problems if it is carried into the materials circuit.

The sum total of all elements not belonging to the group of elements copper, zinc, iron, tin, aluminum, silicon and lead may preferably be at most 0.15 wt %, more preferably at most 0.1 wt %.

In one embodiment of the invention, the Cu fraction present as balance in the alloy may be 64.8 to 71.0 wt %. This is synonymous with saying that the sum total of all alloy constituents which are not copper is 29.0 to 35.2 wt %. The resulting alloys have particularly high ductility. With a Cu fraction in this range, the elongation at break is at least 15%; with a Cu fraction of least 68 wt %, the elongation at break is at least 20%.

In a further embodiment of the invention, the Zn fraction may be 28.5 to 33.5 wt %. This produces alloys having particularly high strength. With a Zn fraction in this range, the tensile strength is at least 630 MPa; with a Zn fraction of at least 31 wt %, the tensile strength is at least 650 MPa.

Advantageously, the Al fraction may be 1.4 to 1.6 wt %. At an Al fraction of at least 1.4 wt %, the corrosion resistance of the alloy is particularly high. At an Al fraction of not more than 1.6 wt %, even with large fractions of zinc, the risk of embrittlement of the material is very low.

The wrought alloy may be used preferably for producing semifinished product in rod, pipe or strip form and for producing sliding elements comprising such an alloy. Such sliding elements may be employed advantageously as bearings in turbochargers or as valve guides.

The invention is illustrated in more detail with reference to working examples and comparative examples.

In an induction furnace, alloys having the composition according to table 1 were melted and cast in each case in block form.

TABLE 1

Chemical composition of the samples.

| Sample No. | Cu wt % | Zn wt % | Al wt % | Sn wt % | Fe wt % | Si wt % |
|---|---|---|---|---|---|---|
| 1 | 70.85 | 25.32 | 1.38 | 1.14 | 0.97 | 0.34 |
| 2 | 68.92 | 27.32 | 1.40 | 1.04 | 0.96 | 0.36 |
| 3 | 67.03 | 29.25 | 1.53 | 0.94 | 0.89 | 0.36 |
| 4 | 64.91 | 31.22 | 1.46 | 0.82 | 1.16 | 0.43 |
| 5 | 63.07 | 33.19 | 1.58 | 1.03 | 0.84 | 0.29 |
| 6 (*) | 62.24 | 35.66 | 0 | 1.03 | 0.75 | 0.32 |
| 7 (*) | 64.54 | 33.34 | 0 | 1.02 | 0.81 | 0.29 |
| 8 (*) | 62.40 | 35.52 | 0 | 1.04 | 0.81 | 0.23 |

(*) Samples with No. 6, 7 and 8 are comparative samples

The sum total of all elements not stated in the table was in each case less than 0.05 wt % and is included arithmetically in the fraction of zinc.

The cast products in block form were hot-rolled, reducing the thickness by 40%. The surface bearing oxide was then removed by milling. This involves the removal of approximately 1 mm of material from each side of the hot-rolled intermediate. The intermediates were cold-rolled with a reduction in thickness from 10 mm to 3 mm and the sheets thus produced were then annealed at 500° C. for three hours. With the exception of sample No. 5, the annealed sheets were rolled to a final thickness of 1.5 mm. In the case of sample No. 5, the final thickness was 1.65 mm. Lastly, all of the samples were annealed at 300° C. for three hours. Mechanical characteristics were ascertained and flexural fatigue tests carried out on the samples. Wear tests were carried out on samples No. 3 and No. 4.

In addition, corrosion tests with an ethanol-oil mixture were carried out on the samples. For this mixture, commercial engine oil was mixed with 6 wt % of ethanol. The samples were exposed to this mixture at 160° C. for 200 hours and then the loss of mass of the samples was determined. Serving as comparative samples, additionally, were samples of the alloys CuZn31Si and CuZn37Mn3Al2PbSi.

Table 2 shows the mechanical characteristics of the samples and documents their corrosion resistance.

TABLE 2

Mechanical characteristics and corrosion resistance.

| Sample No. | Hardness HV10 | Yield point $R_{p0.2}$ in MPa | Tensile strength $R_m$ in MPa | Elongation at break $A_5$ in % | Corrosion resistance |
|---|---|---|---|---|---|
| 1 | 193 | 506 | 618 | 22.0 | good |
| 2 | 193 | 513 | 626 | 21.8 | good |
| 3 | 199 | 517 | 632 | 17.9 | very good |
| 4 | 235 | 515 | 654 | 15.0 | very good |
| 5 | 227 | 509 | 663 | 11.5 | very good |
| 6 (*) | 171 | 418 | 538 | 23.0 | poor |
| 7 (*) | 163 | 409 | 531 | 19.0 | poor |
| 8 (*) | 163 | 390 | 522 | 28.7 | Poor |

(*) Samples No. 6, 7 and 8 are comparative samples

Samples No. 1 to 5, which all contain aluminum, achieve a hardness of more than 190 HV10. Their yield point $R_{p0.2}$ is at least 500 MPa and their tensile strength $R_m$ is between 615 and 665 MPa. With increasing tensile strength, there is a reduction in the elongation at break $A_5$ from 22.0% to 11.5%. Comparative samples No. 6, 7 and 8, which contain no aluminum, have a lower hardness and significantly lower values for the yield point and the tensile strength.

After the corrosion tests, samples No. 3, 4 and 5 had the lowest losses of mass. The mass losses of samples No. 1 and 2 were only slightly greater. In contrast, on the samples without aluminum (samples No. 6, 7 and 8) and also on the samples of the alloys CuZn31Si and CuZn37Mn3Al2PbSi, substantially greater mass losses were ascertained. Furthermore, the sample of CuZn37Mn3Al2PbSi exhibited a markedly different surface by comparison with the rest of the samples. The comparison of the samples No. 1 to 5 with the samples No. 6 to 8, in particular, demonstrates the positive influence of the aluminum on the corrosion resistance of the alloy in ethanol-containing media. It should be noted, however, that the Al-containing alloy CuZn37Mn3Al2PbSi exhibits a significant corrosive attack. This shows that the overall composition of the alloy, particularly the fraction of zinc and also a possible fraction of manganese, are factors influencing the corrosion resistance.

For all the samples, the flexural fatigue tests showed a flexural fatigue strength which is at the level of copper-zinc alloys presently used for sliding bearings. Particularly good results were achieved with samples No. 3 and No. 5.

In sustained operation, a wear test on the samples No. 3 and No. 4 produced friction coefficients of between 0.05 and 0.06. These values are situated at the level of bearing materials currently in use. In step run mode, in which the pressing force was increased from 1.2 N/mm$^2$ in 40 steps to 11 N/mm$^2$, these two samples gave friction coefficients of approximately 0.03. These values are somewhat more favorable than the bearing materials used at present.

The invention claimed is:

1. A wrought alloy for a bearing material for use as a valve guide or in turbochargers of internal-combustion engines operated with ethanol-containing fuels, the composition of the wrought alloy being as follows in wt %:
   Zn: 25.0-34.0%
   Fe: 0.8-1.2%
   Sn: 0.8-1.2%
   Al: 1.3-1.7%
   Si: 0.2-0.45%
   Pb: up to 0.1%,
   the balance being copper and unavoidable impurities, wherein the Cu fraction is at least 64.8 wt %, with the sum total of all elements not belonging to the group of the elements copper, zinc, iron, tin, aluminum and silicon being at most 0.3 wt %, and with the alloy having a microstructure including precipitates in the form of silicides with a fraction of 0.5 to 2.0 vol %, wherein the tensile strength of the wrought alloy is between 615 MPa and 665 MPa and when the tensile strength is between 618 MPa and 654 MPa, the elongation at break is 15.0% or higher.

2. The wrought alloy according to claim 1, wherein the Cu fraction is at most 71.0 wt %.

3. The wrought alloy according to claim 1, wherein the Zn fraction is 28.5 to 33.5 wt %.

4. The wrought alloy according to claim 1, wherein the Al fraction is 1.4 to 1.6 wt %.

5. A semifinished product in rod, pipe or strip form, composed of a wrought alloy according to claim 1.

6. A sliding element comprising a material composed of a wrought alloy according to claim 1.

7. A turbocharger comprising a sliding element according to claim 6.

8. A wrought alloy for a bearing material for use as a valve guide or in turbochargers of internal-combustion engines operated with ethanol-containing fuels, the composition of the wrought alloy being as follows in wt %:
   Zn: 31-34.0%
   Fe: 0.8-1.2%
   Sn: 0.8-1.2%
   Al: 1.3-1.7%
   Si: 0.2-0.45%
   Pb: up to 0.1%,
   the balance being copper and unavoidable impurities, wherein the Cu fraction is at least 64.8 wt %, with the sum total of all elements not belonging to the group of the elements copper, zinc, iron, tin, aluminum and silicon being at most 0.3 wt %, and with the alloy having a microstructure including precipitates in the form of silicides with a fraction of 0.5 to 2.0 vol %, wherein the tensile strength of the wrought alloy is between 615 MPa and 665 MPa and when the tensile strength is between 618 MPa and 654 MPa, the elongation at break is 15.0% or higher.

9. The wrought alloy according to claim 8, wherein the Cu fraction is at most 71.0 wt %.

10. The wrought alloy according to claim 8, wherein the Al fraction is 1.4 to 1.6 wt %.

11. A semifinished product in rod, pipe or strip form, composed of a wrought alloy according to claim 8.

12. A sliding element comprising a material composed of a wrought alloy according to claim 8.

13. A turbocharger comprising a sliding element of the wrought alloy according to claim 8.

* * * * *